Jan. 6, 1959 R. H. SUTTER 2,867,017
METHOD OF AND APPARATUS FOR MAKING RESIN
BONDED SAND SHELL MOLDS AND CORES
Filed Feb. 13, 1957 11 Sheets-Sheet 1
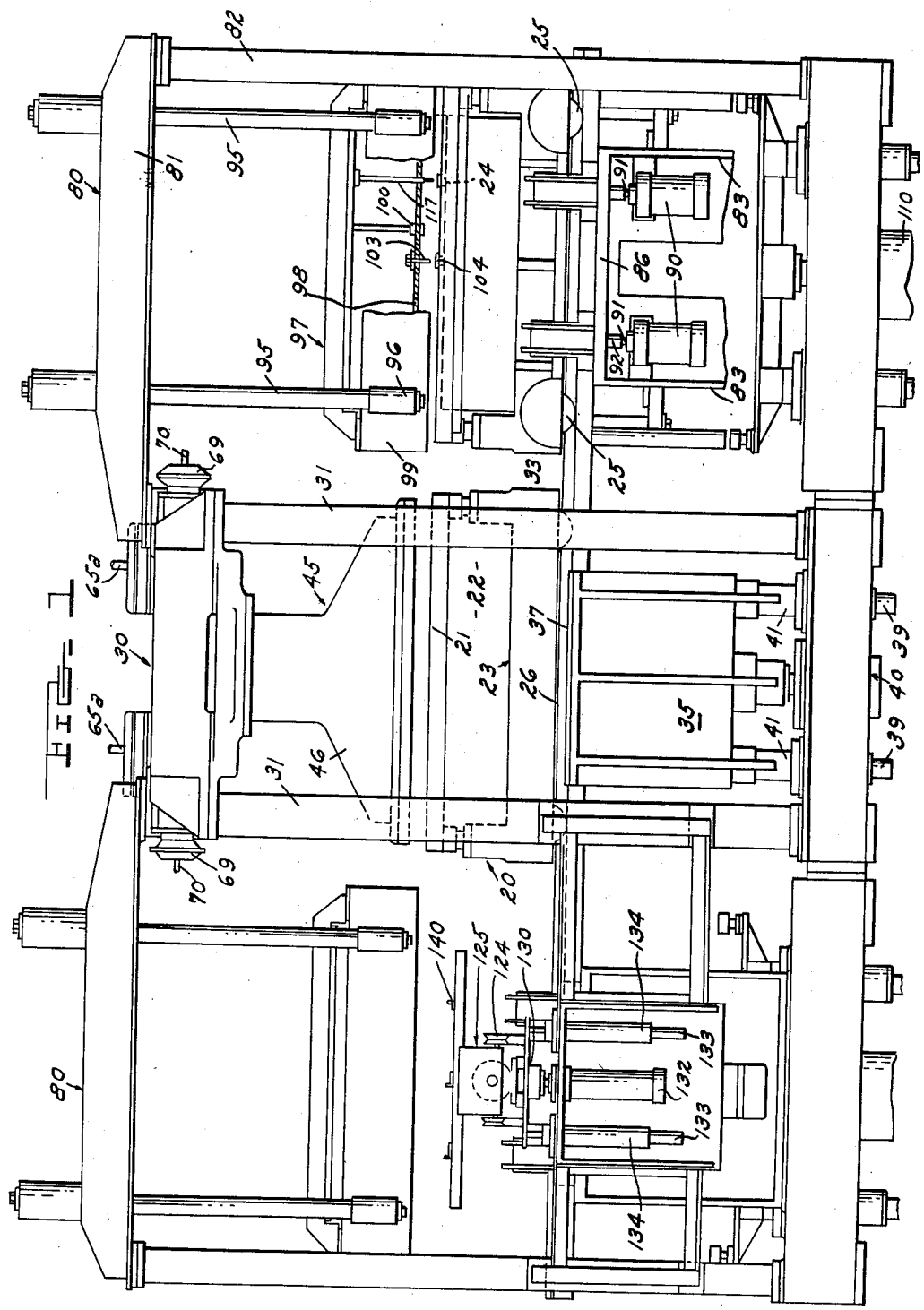

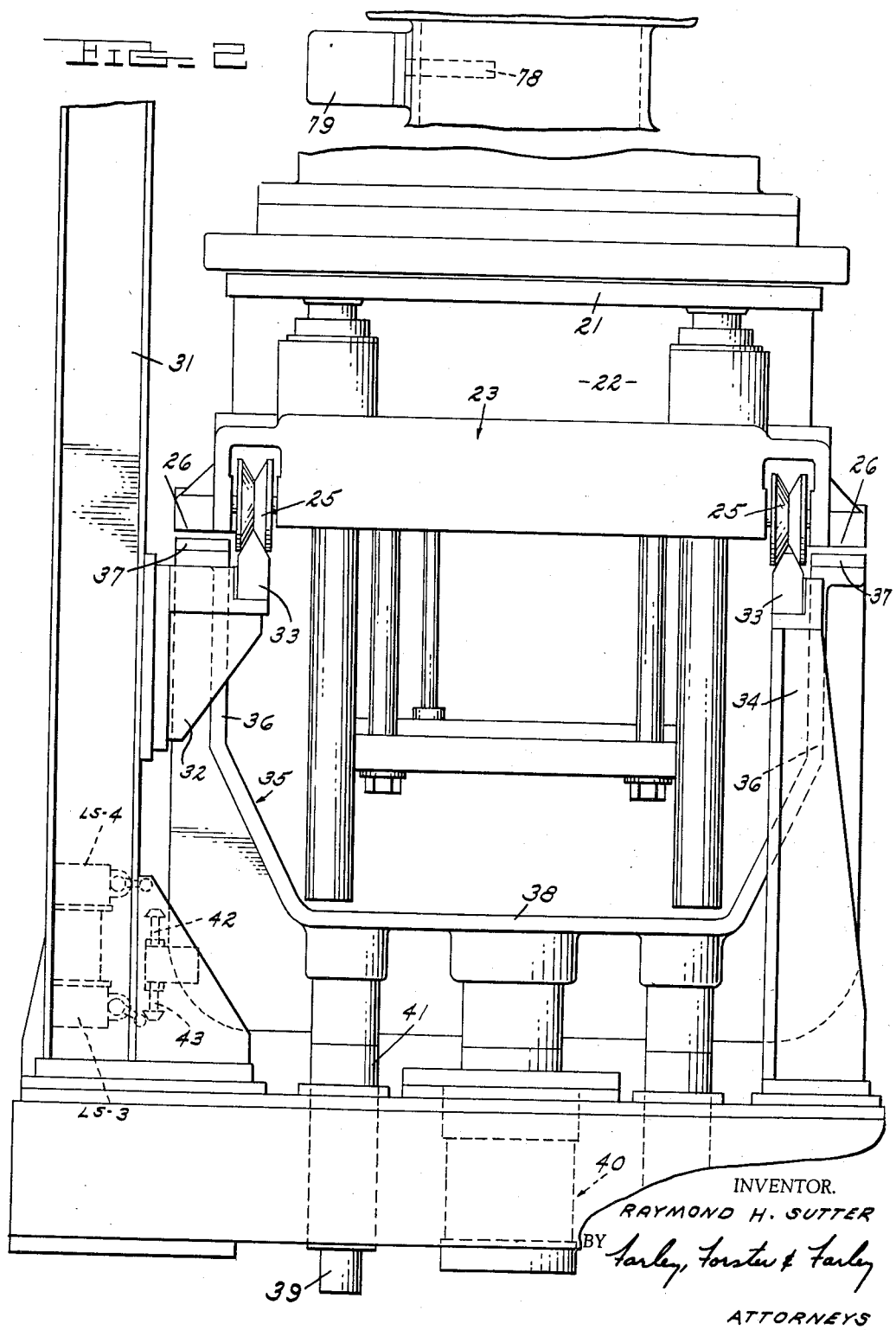

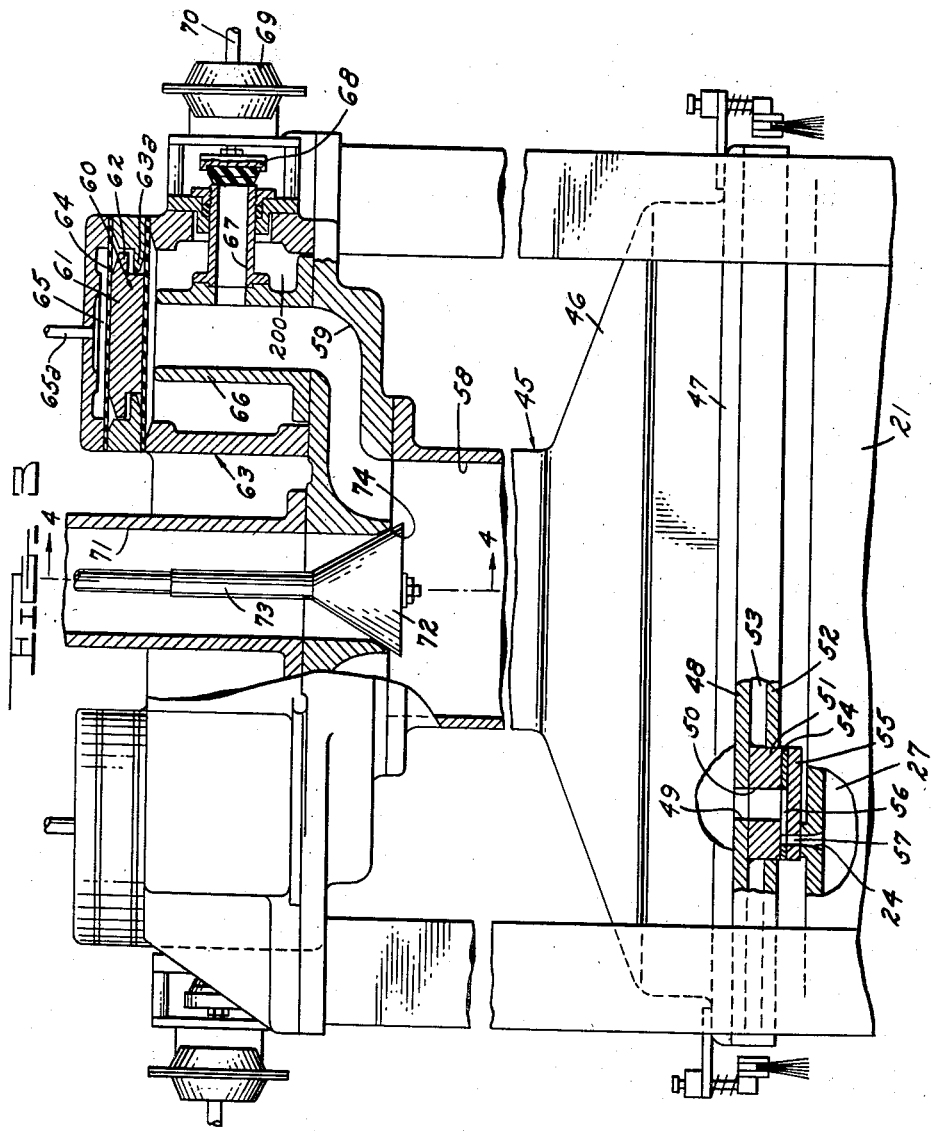

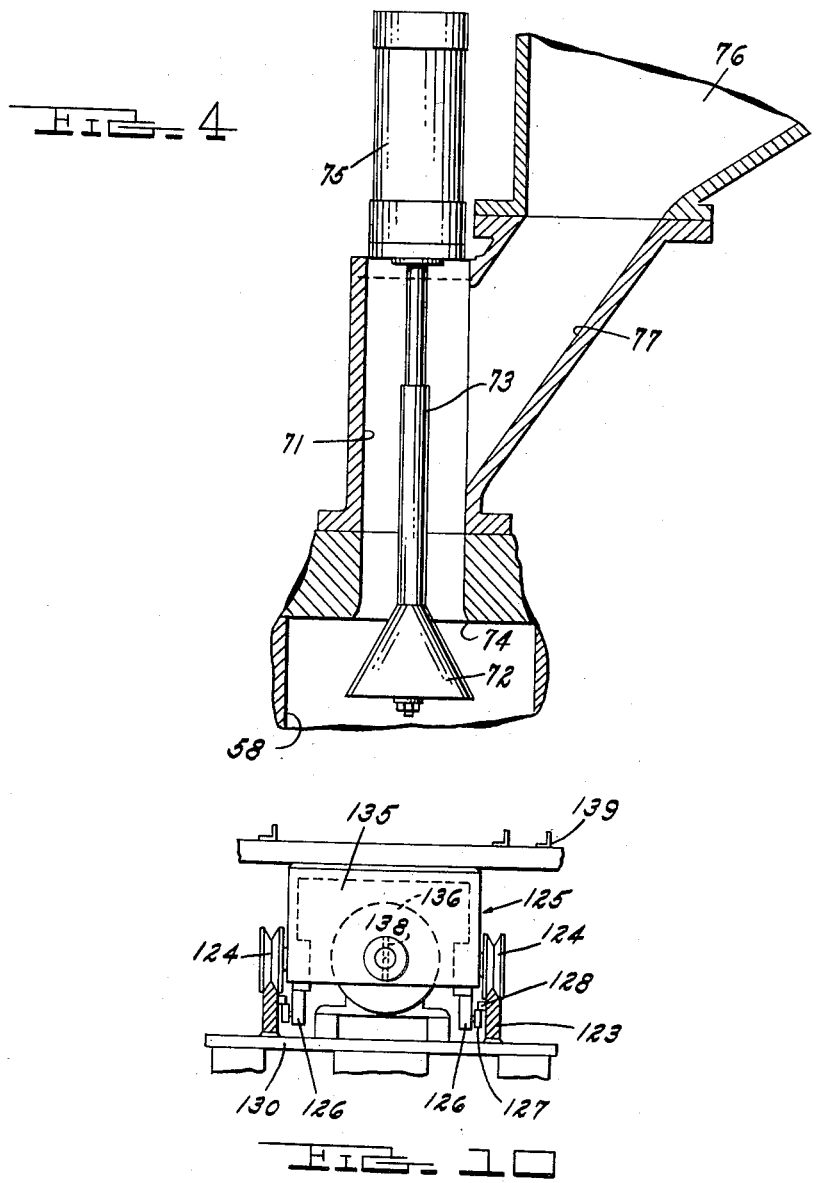

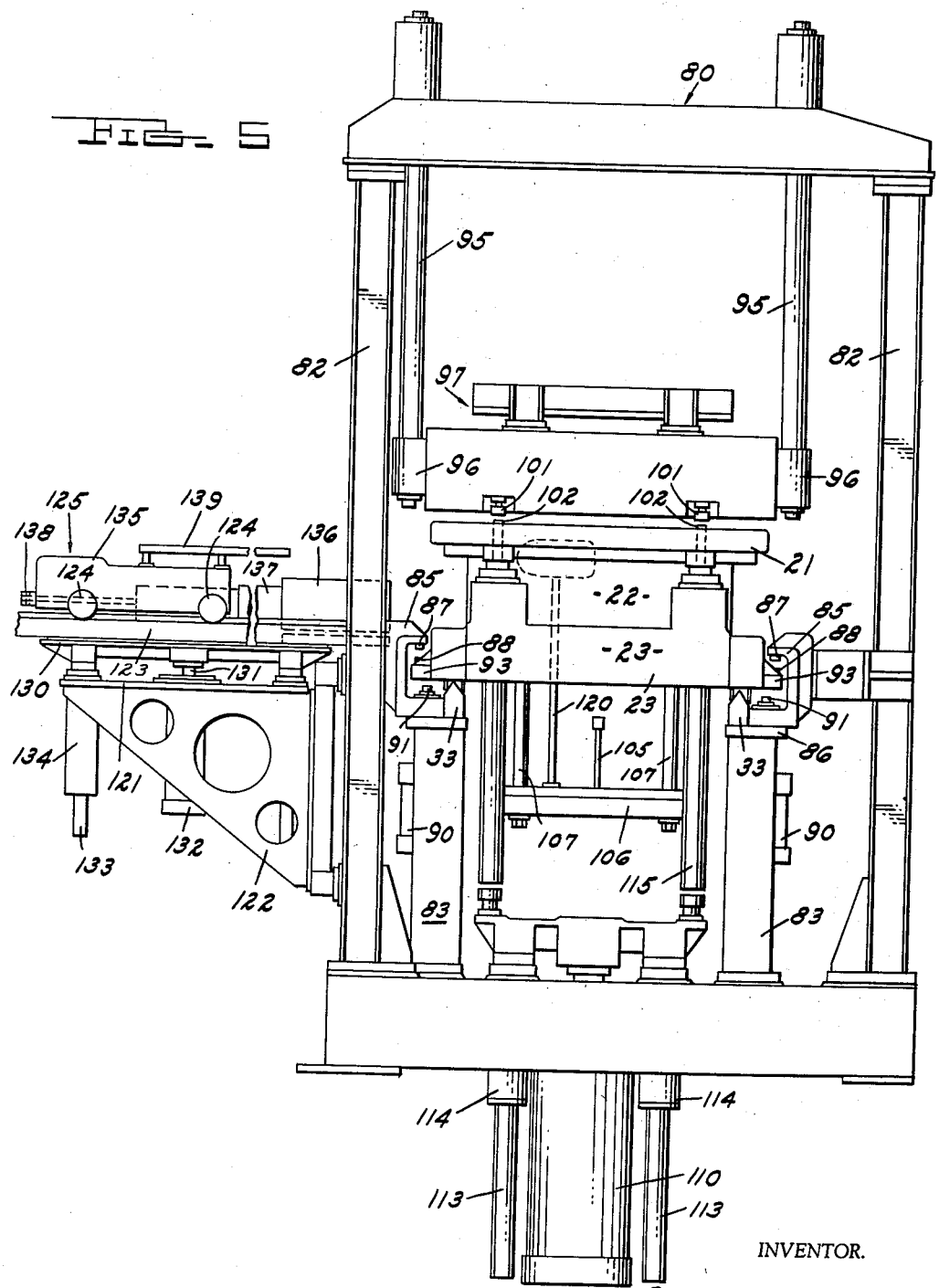

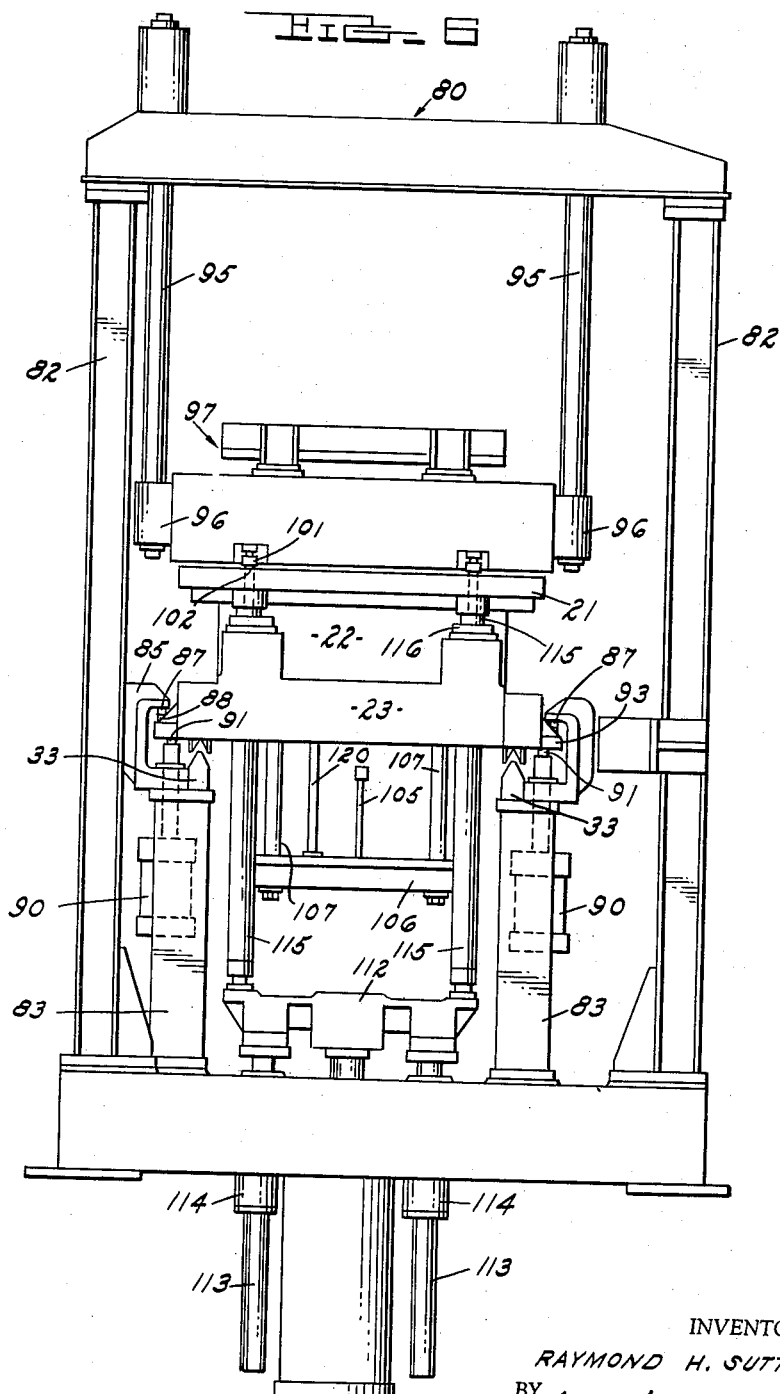

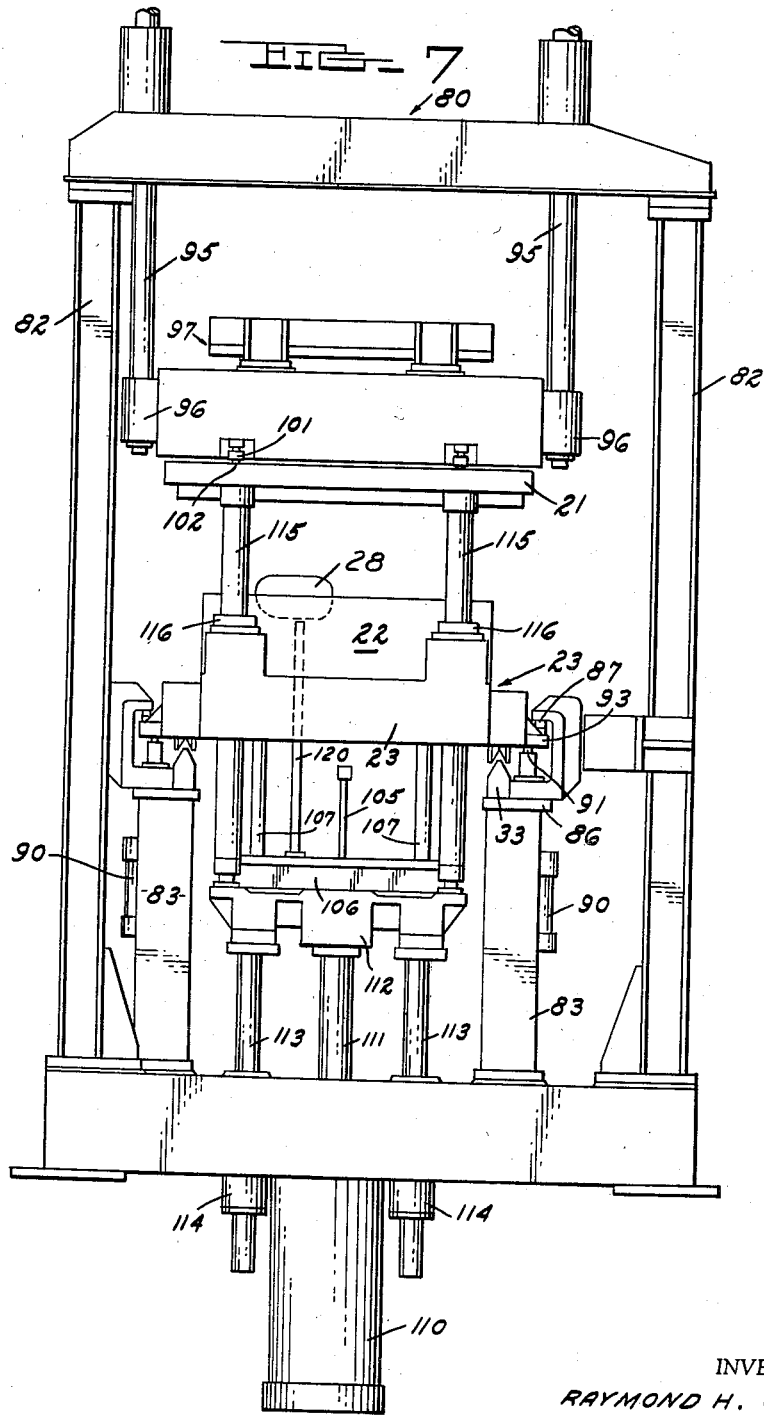

Jan. 6, 1959
R. H. SUTTER
2,867,017
METHOD OF AND APPARATUS FOR MAKING RESIN BONDED SAND SHELL MOLDS AND CORES
Filed Feb. 13, 1957
11 Sheets-Sheet 8
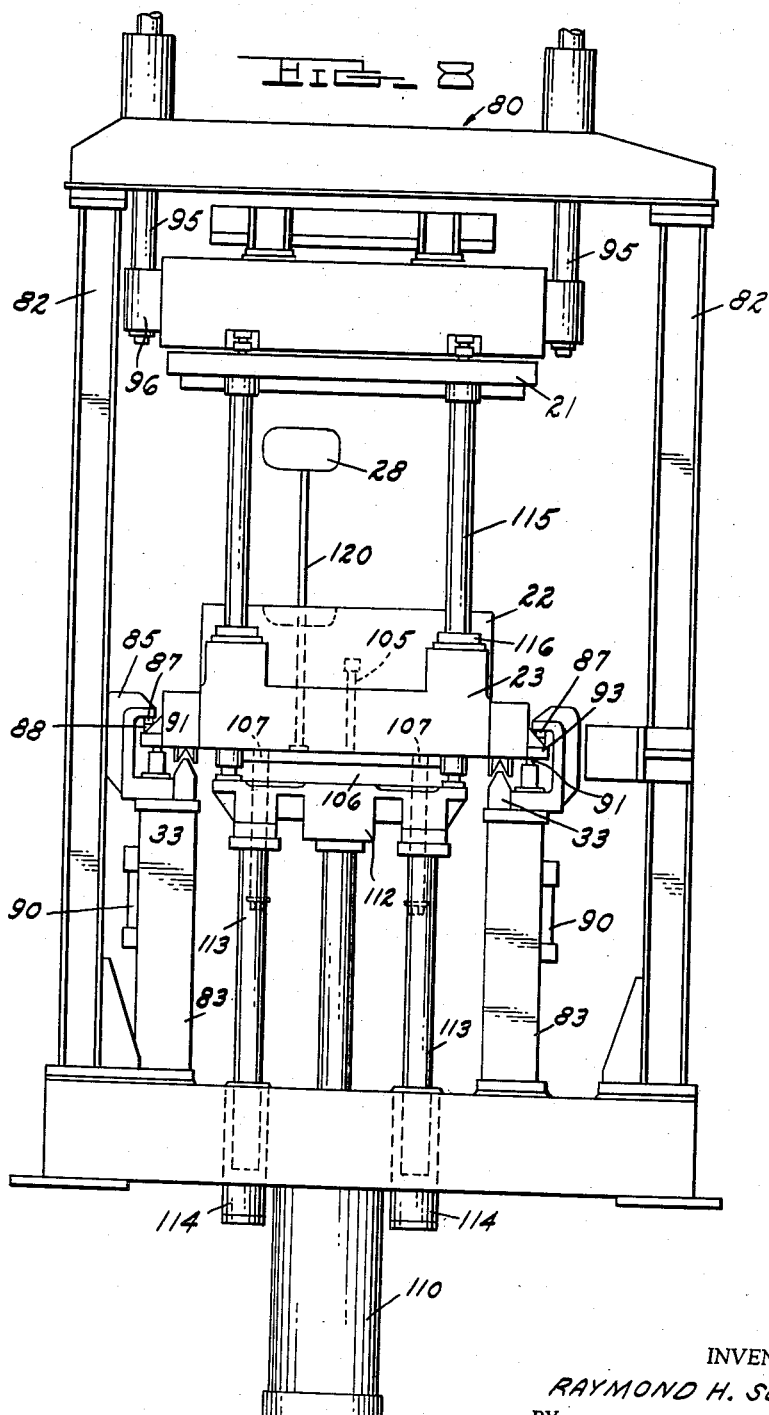
INVENTOR.
RAYMOND H. SUTTER
BY
Farley, Forster & Farley
ATTORNEYS

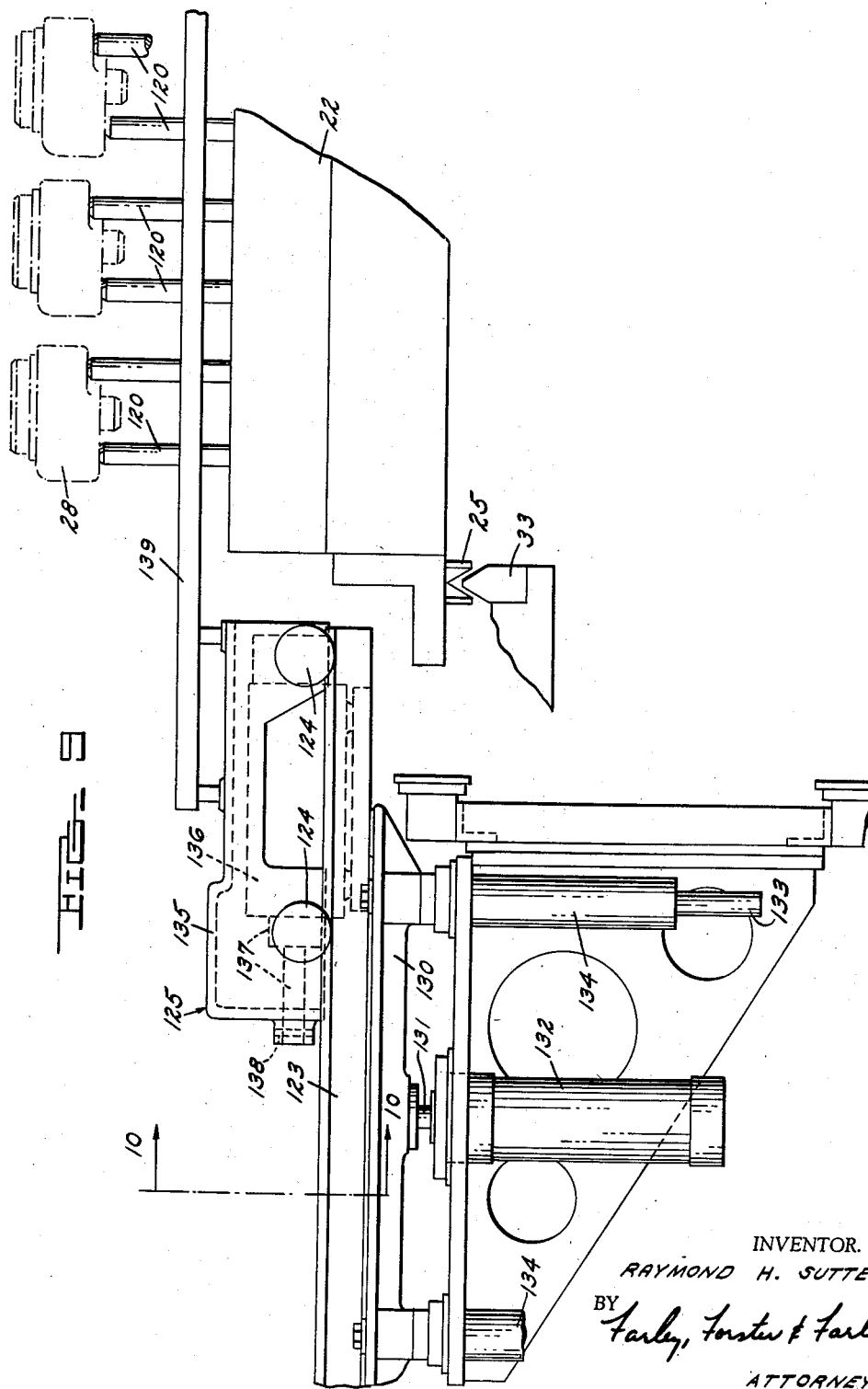

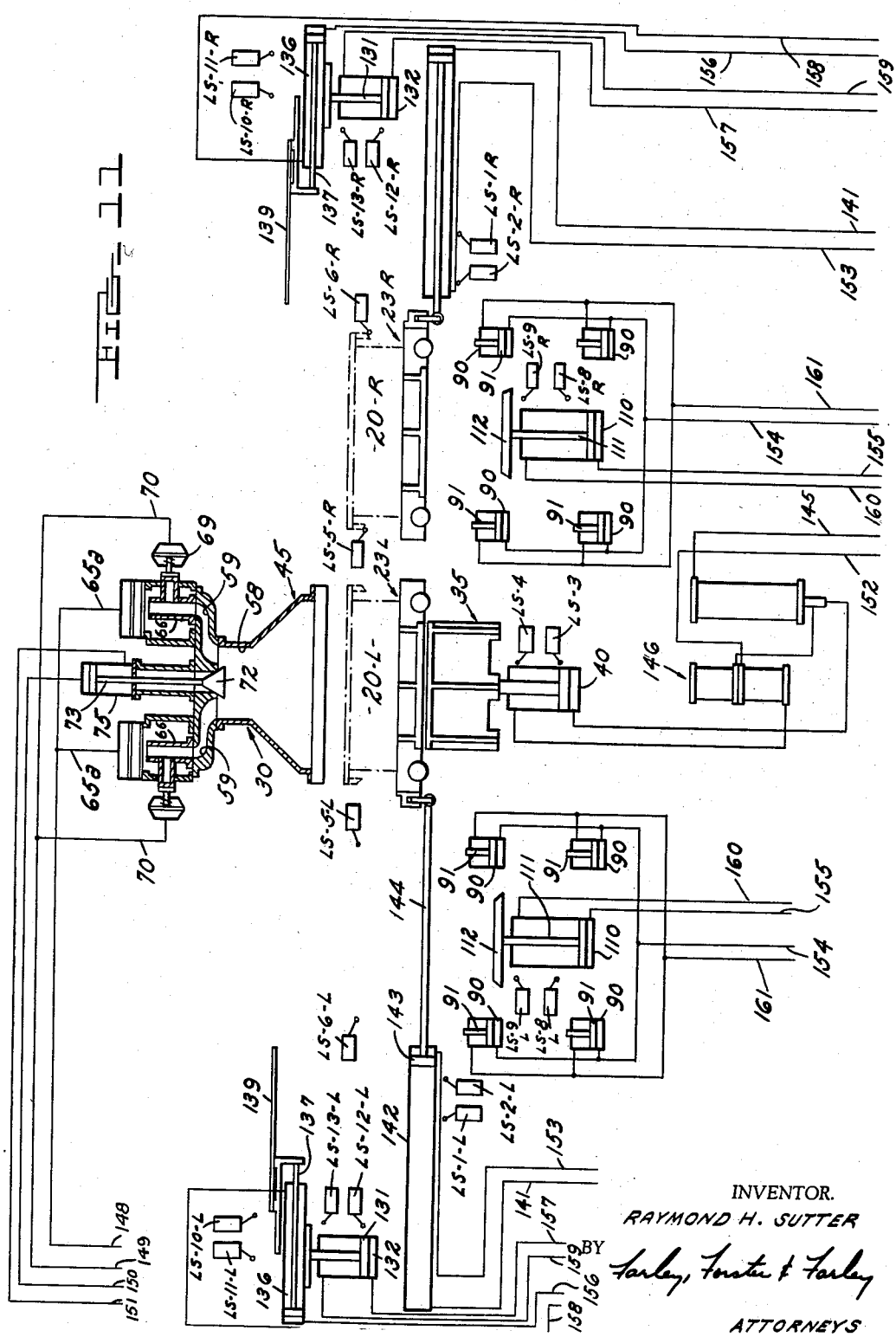

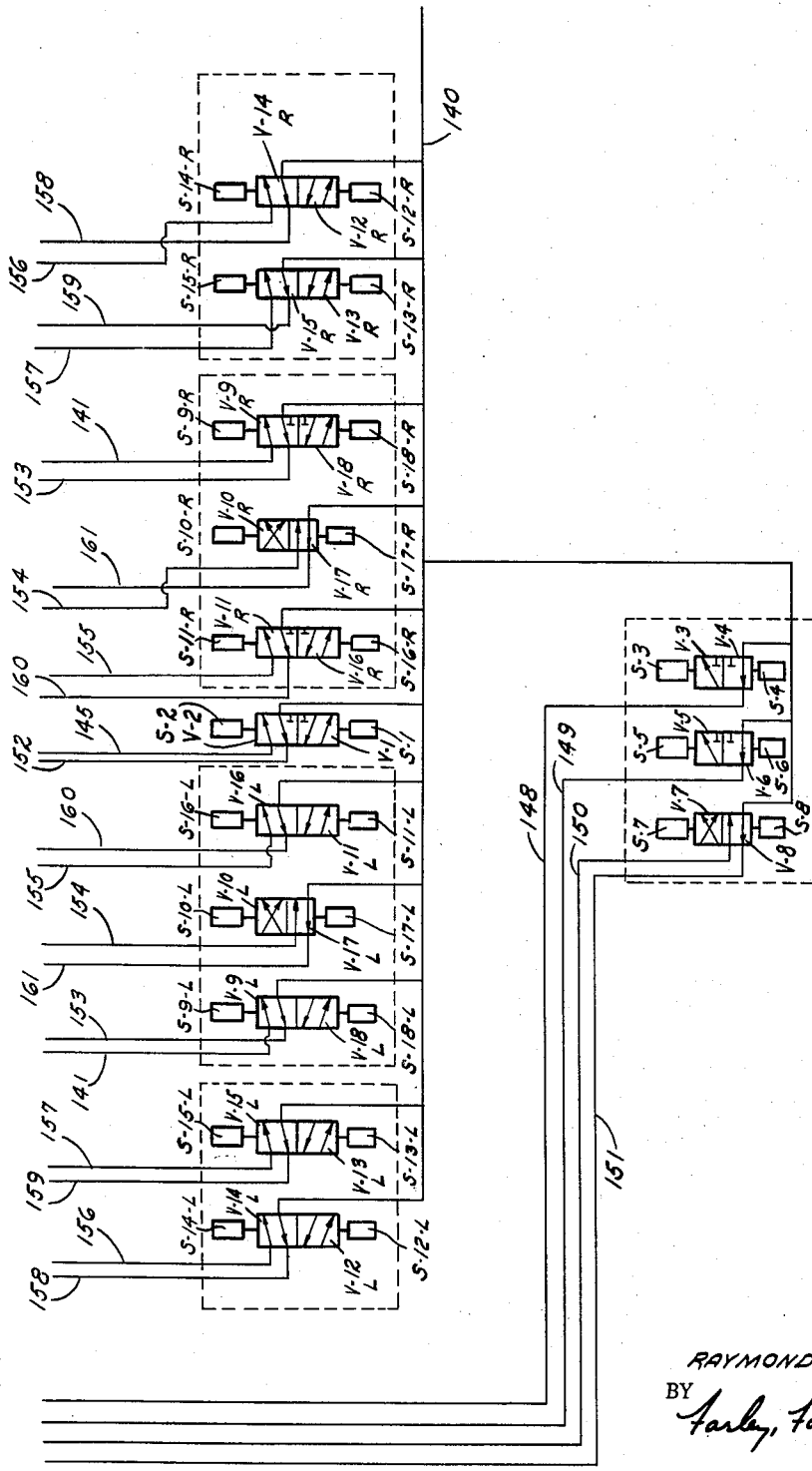

United States Patent Office 2,867,017
Patented Jan. 6, 1959

2,867,017

METHOD OF AND APPARATUS FOR MAKING RESIN BONDED SAND SHELL MOLDS AND CORES

Raymond H. Sutter, Bloomfield Township, Mich., assignor to Sutter Products Company, Holly, Mich., a corporation of Michigan Application February 13, 1957, Serial No. 639,977

3 Claims. (Cl. 22—10)

The present invention relates to a method of and apparatus for making shell molds and cores. More particularly, this invention proposes a novel method of and apparatus for forming resin coated sand components, such as molds and cores, by the blowing and curing of a heat-curable sand composition in a heated pattern box.

This application is a continuation-in-part of my earlier-filed application Serial No. 523,839, filed July 22, 1955, now issued Patent No. 2,856,653, and entitled "Method of and Apparatus for Making Hollow Shell Foundry Sand Articles."

The present invention provides an improved method of and apparatus for forming sand molds or cores from shell molding compositions, i. e., sand having mixed therewith a thermosetting resin. By the process of this invention, a complete sand core or mold can be formed by sequentially blowing the heat-curable sand mixture into the heated pattern box, curing the sand mixture in position, and then bodily removing the core or mold from the pattern box. Further, the apparatus includes a centrally located blow station and two curing and stripping stations, so that a single source of the resin-sand mixture can be utilized to fill two pattern boxes, the cores or molds subsequently being cured and removed at the separate curing and stripping stations. The improved productivity of this apparatus over that conventionally employed will be readily appreciated and has been proved under actual production conditions.

The apparatus is provided with an automatic control system which, once initiated, carries out the method without manual direction or the necessity of manually handling the pattern boxes. The control system preferably includes timing apparatus of conventional type for timing the blowing cycle and the curing cycle, apparatus for transferring pattern boxes from the blowing station to the curing and stripping stations, means for separating the cope and drag portions of the pattern boxes to expose the cured molds or cores, and means for removing the cured molds or cores from the separated cope and drag sections.

It is, therefore, an important object of the present invention to provide an improved apparatus for faster production of heat-cured shell molds or cores of superior quality and finish.

Another object of this invention is the provision of a method for forming a completed shell core or mold by the sequential blowing, curing and stripping operations.

It is a further object of this invention to provide an improved apparatus for the manufacture of shell molds or cores and including a central blowing station and two curing and stripping stations adapted to receive blown shell cores or molds from the blowing station.

Yet another object is the provision of a method for making shell cores or molds in a pair of pattern boxes, each movable between a pair of operating stations, including one common station, and sequentially filling, curing and stripping the boxes and their contents at the stations.

Still a further object of this invention is to provide an apparatus for making shell cores or molds in which a pattern box reciprocates between adjacent stations at which blowing, curing and stripping operations are performed.

It is yet a further object to provide an apparatus for making shell cores or molds in which a heat-curable sand composition is blown through a series of labyrinth passages in a fixed blow plate into a pattern box cavity for subsequent curing therein.

It is still another important object to provide a method of making shell cores or molds by shifting two pattern boxes between a blowing station and two (2) curing and stripping stations, and preventing the movement of the pattern box to the blowing station until the blowing station is empty of pattern boxes.

On the drawings:

Figure 1 is a side elevation of a shell core or mold making apparatus of the present invention, including a central blowing station flanked on either side by a curing and stripping station;

Figure 2 is an end elevation of a central blowing station;

Figure 3 is an enlarged, fragmentary side-elevational view, with parts broken away and in section, further illustrating the central blowing station;

Figure 4 is a fragmentary sectional view taken along the plane 4—4 of Figure 3;

Figure 5 is an end elevational view of one of the curing and stripping stations;

Figure 6 is an adjusted view of the apparatus of Figure 5 illustrating the position of the apparatus during the curing operation;

Figure 7 is a view similar to Figures 5 and 6, but illustrating a transitory condition during the ejection of a finished mold or core from the station;

Figure 8 is a view similar to Figure 7, but illustrating the condition of the apparatus at the conclusion of the ejection operation;

Figure 9 is an enlarged, fragmentary elevational view illustrating the shell removal apparatus;

Figure 10 is a fragmentary, sectional view taken along the plane 10—10 of Figure 9;

Figure 11 is a schematic view illustrating the fluid pressure operated actuating mechanism of the apparatus of the present invention and the control system for this actuating system; and Figure 12 is a schematic view further illustrating the control system and showing specifically the fluid-pressure control valve operating the actuating element.

As shown on the drawings:

In Figure 1, reference numeral 20 refers generally to a pattern box having an upper cope portion 21 and a lower drag portion 22 supported in superimposed relation on a wheeled carriage 23. The box 20 encloses a plurality of interior cavities or recesses cooperatively defined by the cope 21 and the drag 22. The metallic box 20 is provided with upper cope openings 24 which communicate with each of the cavities to accommodate the introduction thereinto of a heat-curable resin-coated sand of the shell molding type. Such a sand may typically comprise 2½ to 10 pounds of a thermosetting resin, such as a urea-formaldehyde, melamine-formaldehyde, furane-formaldehyde or phenol-formaldehyde resin, per 100 pounds of sand. Such a resin coated sand, containing a catalyst or accelerator if desired, is introduced into and cured in position within the pattern box 20 by the present apparatus and method.

For greater ease of explanation, the apparatus of the present invention may be broken down into four general functional parts, namely, the blowing apparatus, the curing apparatus, the stripping apparatus, and the control system. Each of these functional parts will be hereinafter described in detail, as follows:

Shell core and mold blowing apparatus

The blowing apparatus is located at the central blowing station, indicated generally at 30 in Figure 1. This blowing apparatus is supported on a pair of upwardly-extending, laterally-spaced columns 31 which are provided intermediate their height with a pair of transversely-extending brackets 32 (Figure 2) to support thereon a longitudinally-extending guide rail 33. This guide rail 33 extends longitudinally to traverse the central blowing station and each of the flanking curing and stripping stations, for a purpose to be hereinafter later explained. A second guide rail 33 substantially co-extensive with the first guide rail 33 and parallel thereto is supported by a vertical standard 34 which is generally parallel to the post 31.

The wheeled carriage 23 for the pattern box 20 is provided with laterally-spaced, longitudinally-aligned pairs of wheels 25 which contact the rails 33 to be guided thereby for travel therealong.

Generally underlying the pattern box 20, to be in substantial vertical alignment with the pattern box when it is centrally located at the blowing apparatus 30, is a vertically actuated yoke, indicated generally at 35, and having a pair of transversely-spaced, upwardly-extending arms 36 terminating in contact pads 37 adapted to abut vertically-aligned, similarly shaped contact surfaces 26 formed on the pattern box carriage 23 extending outwardly from the wheels 25. The conforming pads 37 and surfaces 26 center the box at the blow station when contact therebetween is established. The yoke table 35 includes a lower, transversely extending cross beam portion 38, and the yoke table 35 is adapted for vertical actuation through an actuating cylinder 40 located centrally of and generally beneath the cross beam portion 38. Laterally and transversely spaced cylindrical guides 39 suspended from the cross beam portion 38 and journalled in bearing sleeves 41 guide this movement of the yoke table 35.

Also carried by the yoke table 35 to project laterally therefrom are a pair of vertically-adjustable abutments 42 and 43. The upper abutment 42 is adapted to contact a limit switch LS4 upon upward vertical displacement of the yoke table 35, while the lower abutment 43 is adapted to contact the actuating arm of a limit switch LS3 when the yoke table occupies its lower position, as illustrated in Figure 2. The utilization of these limit switches LS3 and LS4 in the control of the apparatus will be hereinafter set forth in detail.

Upon vertical movement of the yoke table 35, as upon actuation of the cylinder 40, the yoke table will elevate the pattern box 20 as a unit into contact with a superimposed blowhead indicated generally at 45. Lateral and transverse alignment of the pattern box with the superimposed blowhead 45 is assured by the contacting and mating guide surfaces 26 and 37 formed on the pattern box 20 and the yoke table 35, respectively. The yoke table is effective to elevate the pattern box wheels 25 from their guide rails 33, so as to better laterally and transversely index the pattern box into proper contact with the superimposed blowhead 45.

As best illustrated in Figure 3, this blowhead comprises a lower bell-shaped housing enclosing a sand chamber or compartment 46, the housing terminating in an out-turned peripheral flange 47 having secured to the under-surfaces thereof a horizontal plate 48 having a series of vertical openings 49 therein. These openings 49 communicate with central apertures 50 formed in apertured blocks 51 which serve to support a second head plate 52 in spaced relation to the plate 48 to define therebetween an interior coolant circulation chamber 53, for a purpose to be hereinafter more fully described. Secured to the undersurface of the block 51 are a pair of superimposed plates 54 and 55 which cooperate to define a labyrinth passage 56 therein which terminates in a vertical passage 57 adapted for registry with the openings 24 in the pattern box cope 21 and which communicate with the interior cavity 27. It will be appreciated that one set of the elements 51, 54, 55 and one set of passages 49, 50, 56 and 57 are provided for each cavity 27 in the pattern box 20.

The compartment 46 is adapted to be filled with resin coated sand, of the type heretofore described, and the labyrinth passage 56 is so disposed laterally and transversely with respect to the openings 24 and 49, communicating with the pattern cavity 27 and the compartment 46, respectively, that the angle of repose of the resin coated sand is greater than the flow angle through the labyrinth passages 56, 57. Thus, no flow of the resin coated sand can occur from the compartment 46 into the opening 24 so long as the sand is subjected only to gravitational forces, and the sand will remain in the compartment 46 until subjected to the air pressure of a blowing operation hereinafter described. The circulation of a coolant fluid, such as water, through the chamber 53 will prevent heat transfer from the heated pattern box to the blowhead, thus preventing curing of the resin coated sand in the labyrinth passages.

Air is supplied to the compartment 46 through a generally cylindrical, vertically-extending passage 58 superimposed over the compartment 46. This passage 58 receives air through a laterally and vertically-extending passage 59 through which the flow of air is controlled by a diaphragm-actuated valve element 60. The valve 60 comprises a valve body 61 having a peripheral outturned flange 62 adapted for cooperation with a valve casing flange 63a formed in the valve casing 63. The valve body 61 is disposed between a pair of diaphragms 64. The upper of these diaphragms cooperates with the surrounding casing to define an air chamber 65 adapted to be supplied with compressed air through line 65a. So long as air under pressure is supplied to the line 65a, the diaphragm will be urged downwardly to move the valve body 61 so that the lower diaphragm contacts the annular upper end of an air chamber inlet 66 extending axially of the casing 63 to prevent the flow of air from the reservoir 200 into the compartment 46 through the passages 59 and 58. When the supply of compressed air through the line 65a is interrupted, the diaphragms 64 elevate the valve body 61 so that clearance is provided between the lower diaphragm 64 and the upper end of chamber inlet 66, and air can then be supplied to the passages 59 and 58 to blow the resin coated sand through the passages 49, 50, 56, 57 and 24 into the pattern box cavity 27.

The passage 59 communicates with an exhaust passage 67 extending laterally from chamber 66 and controlled by an exhaust popper valve 68 adapted to be actuated by an air pressure diaphragm housed in a casing 69. Air is supplied to the casing 69, as through a line 70, to normally retain the valve 68 in its closed position. Air is cut off through the line 70 to allow the valve 68 to open after the introduction of sand into the cavity 27 has been completed, thus venting the compartment 46 to the atmosphere.

Sand is supplied to the compartment 46 from a superimposed hopper 76 (Figure 4) through a central, vertical passage 71 which is controlled by a vertically-actuated, generally-conical valve body 72 disposed at the lower end of a vertical actuating rod 73 extending axially in the passage 71. The valve body 72 is preferably formed of rubber or similar elastomeric material and cooperates with a frustroconical valve seat 74 formed at the lower extremity of the passage 71.

The valve-actuating rod 73 is reciprocated by an air cylinder 75 superimposed over the passage 71, as best shown in Figure 4. Also, as shown in Figure 4, the passage 71 communicates with the hopper 76 through a laterally and upwardly-inclined passage 77. Operation of the cylinder 75, to open and close the passage 71 by the valve body 72, is controlled through an electronic level control or sand probe 78 which extends into the cylindrical passage 58 communicating with the compartment 46. Signal means 79, of electronic type, is located exteriorly of the passage 58 for actuating the cylinder 75 to move the valve 72 downwardly to its opened position (as illustrated in Figure 4) for accommodating the entry of additional sand to the hopper 76, whenever the probe 78 indicates the need for such additional sand.

It will be seen in Figures 1 and 3 that a pair of identical air inlet passages 58 are provided, and duplicate valves 61 and 68 are provided to control the flow of air from the reservoir 200 through these two passages 59 into the compartment 46. The operation of the valves 61 and 68 are controlled through the control system illustrated in Figures 11 and 12, and hereinafter described in detail.

The operation of the blowing apparatus herein disclosed will be readily appreciated by those skilled in the art, and will be described in detail in conjunction with the control system.

Shell and core curing apparatus

After the shell mold or core has been blown at the blowing station indicated at 30 in Figure 1, the pattern box 20 is shifted laterally to one side of the blowing apparartus to a curing station, indicated generally at 80 in Figure 1. It will be noted that two such curing and stripping stations 80 are provided, so that a pair of pattern boxes may be utilized, one of the boxes being at the central blowing station, and the other of the boxes being at one of the laterally-located curing and stripping stations at any given time, as will be hereinafter more fully described. Inasmuch as the two curing and stripping stations are identical, only one of these stations will be described in detail.

Generally, the curing apparatus comprises two rectangularly-arranged beams 81 which are supported along one transverse side on the uprights 31 of the blowing apparatus 30 and at their other or outer ends upon a pair of transversely-spaced, vertically-extending columns 82. The laterally-extending guide rails 33 project laterally from the blowing apparatus to traverse each of the curing and stripping stations, these rails being supported at their outboard ends by the transversely-spaced supports 83 illustrated in Figure 5.

Immediately adjacent and transversely outwardly of the rail 33 are a pair of generally C-shaped stop brackets 85 mounted on a longitudinally-extending plate 86 bridging the supports 83 to either side of the rail 33. These stop brackets 85 are provided with suspended upper stops or abutments 87 which are in vertical alignment with corresponding abutments 88 formed on the wheel carriage 23 of the pattern box.

Also supported by the supports 83 and in vertical alignment with the abutments 87 are a plurality of pre-strip cylinders 90, the vertically-extending actuating rods 91 of which are guided for vertical movement by fixed vertical sleeves 92 (Figure 1) carried by the plates 86. Upon actuation of the cylinders 90, the rods 91 contact flanges 93 formed on the pattern box carriage 23. In Figure 6, the cylinders 90 are shown in their actuated positions to elevate the pattern box carriage wheels 25 from the guide rails 33, bringing the abutments 88 on the pattern box carriage into abutment with the fixed stops 87 on the brackets 85. By this operation, the pattern box and its carriage will be level and accurately positioned for the subsequent mold or core curing operation. Any possible misalignment of the rails 33 would have no effect upon this leveling of the pattern box.

Suspended from the superstructure defined by the beams 81 are a plurality of laterally and transversely-spaced guide rods 95 fastened by means of fixed brackets 96 to an upper gas oven hood 99. The gas manifold 97 is defined by a pair of vertically-spaced plates 98 (Figure 1) surrounded by a sheet metal hood 99 to which brackets 96 are joined, the lower plate 98 carrying a plurality of burner nozzles 100 connected to a suitable source of a combustible heating gas.

At the time that the carriage 23 is moved into the curing and stripping station 80, the upper or cope portion of the pattern box clears the upper gas manifold (as shown in Figure 5), but upon energization of the cylinders 90 to elevate the carriage 23 and pattern box 20, contact is established between abutments 101 of the upper gas manifold 97 and abutment pins 102 at the upper edge of the pattern box 20 (as shown in Figure 6).

Thus, the sheet metal manifold 97 is in close proximity to the upper surface of the pattern box and efficient heating through the gas burners 100 is facilitated. Accurate alignment between the manifold 97 and the pattern box is assured by suspended locating pins 103 carried by the lower plate 98 of the manifold 97 and pin-receiving recesses 104 located in the upper surface of the pattern box 20. The drag portion of the pattern box is heated by a quantity of burners 105 which are carried by a transversely-extending drag gas manifold 106 disposed for vertical movement upon fixed drag plate guides 107 carried by the drag portions of the pattern box (Figure 5). The functions of this drag gas manifold in ejecting finished molds or cores from the pattern box will be hereinafter described.

After the pattern box has been accurately located and centered beneath the manifold by actuation of the cylinders 90, the blown molds or cores are cured by heating through the burners 100 and 105. These burners may be continuously operated or turned off and on in accordance with the desired heating cycle. Preferably, the heating cycle is automatically timed by conventional means (not shown), as well understood in the art.

Following the timed curing cycle, the cured molds or cores must be removed from the pattern boxes.

Mold or core stripping apparatus

This removal of the completed molds or cores from the pattern boxes is accomplished at the curing and stripping station 80 through the medium of a stripping cylinder 110, Figures 1, 7 and 8.

The stripping cylinder 110 has an actuating rod 111 which projects vertically upwardly for connection to a crosshead 112. This crosshead 112 extends transversely and is guided for vertical movement, upon reciprocation of the actuating rod 111, by a pair of transversely-spaced guide rods 113 guided in sleeves 114. The crosshead contacts the lower extremities of suspended cope corner pins 115, one of these pins being located at each corner of the cope portion 21 of pattern box 20 and being guided in vertically-extending guide sleeves 116 carried by pattern box carriage 23. Vertical actuation of the piston rod 111 and consequent upper movement of the crosshead 112 will elevate the cope, through the cope corner pins 115, to separate the cope and the drag, thus providing access to the blown molds or cores 28, as best seen in Figure 7 of the drawings.

In order to insure retention of the molds or cores 28 in the drag portion of the pattern box, the upper plate 98 of the manifold 97 carries several suspended hold-down pins 117 (Figure 1) which contact the molds or cores 28 through the filling neck 24 of the cope 21, when the pattern box is elevated as a whole by actuation of the pre-strip cylinders 90. It will be noted that these pins 117, and particularly the reduced ends thereof, are suspended from the plate 98 sufficiently to contact the molds or cores and knock them loose from the cope section prior to the elevation of the cope through the crosshead 112, as heretofore explained.

After the crosshead 112 has been elevated to the position of Figure 7, it contacts the drag plate 106 which, it will be recalled, is freely movable vertically upon the fixed guides 107. This drag plate 106, being freely movable on the guides 107 relative to the drag 22, carries several upwardly-projecting mold or core knockout pins 120. One or more such pins 120 are provided for each cavity 27, and continued movement of the piston 111 and the cross head 112 will, through the knockout pins 120, elevate the molds or cores to raise them from the drag 22. This position of the molds or cores 28, the pins 120, the drag plate 106 and the crosshead 112 is illustrated in Figure 8 of the drawings.

At the same time that the drag plate 106 is elevating the molds or cores from the drag 22, the cope is further moved vertically by continued abutment of the cope corner pins 115 with the crosshead 112. Consequently, the cope is moved upwardly from its position overlying the drag, the drag is retained in its fixed position by abutment of the stops 87—88, and the finished molds or cores have been elevated to a position intermediate the cope and the drag through the pins 120.

To remove the mold or cores 28 from the pins 120, an ejecting mechanism, best illustrated in Figures 5 and 9 of the drawings, is utilized.

As illustrated, this ejection mechanism is mounted upon a fixed platform 121 projecting transversely from one of the vertical posts 82 and reinforced by a pair of apertured triangular side plates 122. The plate 122 supports, through a table 130, a pair of laterally-spaced guide rails 123 upon which is disposed a wheeled ejection carriage indicated generally at 125. This carriage 125 has wheels 124 journalled thereon and engaging the rail 123 for movement transversely of the curing and stripping station 80. To vertically stabilize the carriage 125, a pair of suspended supports 126 carry rollers 127 contacting the under surface of a keyway 128 parallel to and co-extensive with the carriage rail 123 (Figure 10). The table 130 is supported for vertical movement by the actuating piston rod 131 of a fluid-pressure actuated cylinder 132, the table 130 being stabilized by suspended rods 133 journalled for vertical movement in sleeves 134.

The carriage 125 (best illustrated in Figure 9) comprises a hollow body 135 of generally U-shape and straddling an actuating cylinder 136 having telescopic cylinder rods 137 anchored to the carriage, as at 138. Actuation of the cylinder 136 to extend the same will move the carriage laterally away from the curing and stripping station 80, while retraction of the piston rods 137 will move the carriage toward the curing and ejection station. The carriage is provided, at its upper portion, with several equally spaced, parallel elongated, fixed ejection rods 139 which are adapted for projection beneath the completed mold or core 28 and in interleaved relation with the rejection pins 120 when the carriage is in its inner position, illustrated in Figure 9 of the drawings. In other words, the ejection rods 139 are adapted to be interposed between the completed mold or core 28 and the pattern box drag 22 when the carriage is actuated by the cylinder 136 to the position illustrated in Figure 9 of the drawings. Upon actuation of the cylinder 132, the table 130 will be elevated, together with the ejection carriage 125, until the ejection rods 139 contact the mold or core 28 to lift the mold or core 28 off the ejection pins 120. Following such elevation of the mold or cores 28, the cylinder 136 is then actuated to extend the rod 137, thus retracting the ejection rods 139 from the curing and ejection station. Following such retraction of the mold or cores 28, the cylinder 132 is then actuated to lower the table 130 to the "at rest" position of the ejection apparatus, as shown in Figure 5. The mold or cores can be removed from the ejection rods 139 before, during, or after the final lowering of the table 130.

*The control system*

As illustrated in Figure 1 of the drawings, the complete mold or core making apparatus of the present invention comprises the central blowing station 30 and the pair of flanking curing and stripping stations 80. The guide rails 33 traverse all three stations, and two pattern box carriages 23 are provided. These pattern box carriages are adapted to be actuated by suitable means, such as air pressure actuated cylinders illustrated schematically in Figure 11.

The control system includes means for elevating a pattern box at the central blowing station 30, this means in the illustrated embodiment being the vertically actuatable cylinder 40, together with the appropriate valve means for controlling the blowing operation.

The control system also includes separate control circuits for the two curing and stripping stations 80, the control means for these two stations being coordinated with each other and with the system of the central blowing station, so as to accurately control and correlate movement of the two pattern boxes and carriages. Those portions of the control mechanism for the left-hand pattern box 20L are designated by the suffix "L," while those portions of the control mechanism pertinent to the operation of the right-hand pattern box 20R are identified by the suffix "R."

To initiate operation of the control system, the control valve V18L is moved to the right from its illustrated position in Figure 12, as by energization of the solenoid S18L. This solenoid S18L is preferably energized manually and is effective to vent fluid pressure from a source and through line 140, the valve V18L and line 141 to the left-hand side of a cylinder 142. The cylinder 142 has disposed therein a piston 143 connected through an actuating rod 144 to the left-hand pattern box carriage 23L. Before movement of the carriage 23L to its position illustrated in Figure 11 under the blowing station 30, limit switches LS1R (actuated when the right-hand carriage 23R is in its illustrated retracted position), limit switch LS3 (actuated when the yoke 35 is in its lowered position) and limit switches LS5L and LS6L (indicating the presence of the carriage 23L in its lowered position at the end of the curing and stripping cycle) are actuated.

Once the carriage 23L occupies its illustrated position of Figure 11, limit switch LS2L is actuated to energize the solenoid S1, moving the valve V1 into registry with line 145 and which is effective through a multiple piston pneumatic-hydraulic pressure intensifier 146, of conventional type, to energize the cylinder 40 to elevate the yoke 35, thus elevating the carriage 23L and pattern box 20L to the blowing position illustrated in Figure 3.

When this elevated position has been attained, the limit switch LS4 is actuated by its actuation arm 42 (Figure 2). The actuation of the limit switch LS4 energizes the solenoid S3 to cut off the supply of air through the line 148 to the blow valves 60, thus opening these valves to introduce air into the blow chamber 46. This introduction of air into the blow chamber 46 is sufficient to force the resin coated sand and air mixture through the labyrinth passages 56 and 57 into the chamber 27, and the mold or core is blown. The blowing of the mold or core is preferably regulated through a conventional timer (not shown) and when this timer has completed its cycle, the valve V3 is moved to its illustrated position of Figure 12 by the spring S4, the valve V4 passing fluid under pressure through the line 148 to again close the blow valves 60.

At the end of the timer cycle for the blow valve V3, exhaust valve V5 is energized through solenoid S5 to vent an exhaust line 149 to atmospheric pressure, accommodating the opening of the exhaust poppet valves 68, so that all pneumatic pressure in the blow chamber 46 is dissipated. The period of opening the exhaust valve V5 is also a timed function, and upon expiration of this time, the spring S6 moves the valve V6 into registry with the exhaust valve supply line 149 to again close the exhaust valves.

Upon the expiration of the exhaust timing cycle, the solenoid S7 is energized to actuate the valve V7 to an adjusted position in registry with the lines 150 and 151 which are connected, respectively, to opposite sides of the cylinder 75 for controlling movement of the sand-fill valve 72. However, the circuit for energizing solenoid S7 is in series with the circuit for the sand probe 78 so that the sand-fill valve V7 will be opened only as there is demand for sand in the chamber 46. If sand is demanded, filling of the chamber 46 to the level of the probe 78 will cause the proper circuit to de-energize the solenoid S7, so that the valve V8 is moved into registry with the lines 150 and 151 under the bias of the spring S8.

Simultaneously with the possible energization of the solenoid S7, the expiration of the exhaust timing cycle is effective to energize the solenoid S2 so that the valve V2 is moved to its illustrated position of Figure 12. Thus, the line 152 leading to the atmospheric intensifier 146 is connected to the source line 140, and the blow station yoke 35 is lowered by operation of the cylinder 40. When the cylinder 40 reaches its lowermost position, illustrated in Figure 11, the limit switch LS3 is actuated to energize solenoid S9L for interconnecting the source line 140 with the line 153 for retracting the piston 143, rod 144, and carriage 23L to the left.

When the carriage 23L vertically registers with the left-hand curing and stripping station 80, the limit switch LS1L is closed. If the limit switches LS1L, LS3, LS5R and LS6R are in their proper actuated conditions, the right-hand carriage 23R will now be actuated automatically to move to the left to a position corresponding to the illustrated position of carriage 23L and directly underlying the blow station. This actuation of the carriage 23R is accomplished through the valve V18R under the control of the solenoid S18R. Subsequent actuation of the cylinder 40 to elevate the carriage 23R and opening of the blow valves 60 will be accomplished as heretofore explained with respect to the carriage 23L.

To return to the movement of the carriage 23L, once it has assumed its position in registry with the left-hand curing and stripping station, with subsequent actuation of the limit switch LS1L, this limit switch (LS1L) is effective to energize the solenoid S10L, thus moving the valve V10L to interconnect the source line 140 and the supply line 154 for the pre-strip cylinders 90. These pre-strip cylinders elevate the carriage 23L from the rails 33 and engage the carriage stops 88 with the fixed index stops 87, thus accurately positioning the carriage 23L and the pattern box 20L beneath the upper curing manifold 97. The actuation of the limit switch LS1L also energizes the curing timer (not shown) which times the curing operation, as has been heretofore described.

Operation of the curing timing cycle then energizes solenoid S11L which moves the valve V11L to interconnect the source line 140 and the line 155 which supplies fluid pressure to the lower end of stripping cylinder 110. The operation of the stripping cylinder 110 elevates the stripping crosshead 112 to sequentially elevate the cope portion 21 of the pattern box 20 (thus exposing the cured mold or cores 28) and then elevates the drag plate 106 and the strip pins 120 carried thereby to raise the completed mold or cores 28 to a position intermediate the elevated cope and the stationary drag.

When the strip cylinder reaches the end of its upward movement, the limit switch LS9L is actuated, and this limit switch energizes valve V12L to interconnect the source line 140 and the ejector line 156 connected to the left-hand end of the ejector cylinder 136. Energization of this cylinder 136 will move the telescoping piston 137 so that the ejector carriage 135 is moved inwardly, i. e., toward the mold or cores 28 so that the ejector rods 139 underlie the mold or cores 28 in interleaved relation with the strip pins 120. At the completion of inward movement of the ejector carriage 135, limit switch LS10L is energized to energize solenoid S13L, thus moving valve V13L to interconnect the source line 140 and the line 157 leading to the lower end of the ejector elevating cylinder 132. The ejector table 130 is thus elevated to bring the rods 139 into contact with the completed mold or cores 28 and to elevate the mold or cores from engagement with the strip pins 120.

The molds or cores 28 are now completely free of the pattern box. At the end of the upward stroke of the piston rod 131, the limit switch LS13L is actuated to energize the solenoid S14L. The solenoid S14L actuates the valve V14L to interconnect the source line 140 and the ejector carriage retracting line 158 so that the right-hand end of the cylinder 136 is connected to fluid pressure, thus extending the telescopic piston rod 137 and moving the carriage 135 to the left. Thus, the mold or cores 28 supported on the ejection rods 140 are retracted from their positions intermediate the cope and the drag. At the completion of this left-hand movement of the ejector carriage 135, the limit switch LS11L is actuated to energize the solenoid S15L so that the valve V15L connects the upper end of the cylinder 132 to the source line 140 through the line 159. The ejector carriage is thus returned to its position illustrated in Figures 1 and 5 with the mold or cores being borne by the rods 139.

Actuation of the limit switch LS12L by the cylinder 132 will energize the solenoid S16L to interconnect the upper end of the strip cylinder 110 and the source line 140 through the line 160. Lowering of the stripping crosshead 112, to again place the cope portion 21 on the drag portion 22 of the core box 20, will actuate the limit switch LS8L so that solenoid S10L is de-energized and the spring S17L is effective to interconnect the pre-strip cylinders 90 with the line 161 to finally lower the carriage 23L and the reassembled pattern box onto the guide rails 33. The reassembled pattern box and carriage are now ready for the next cyclic operation upon re-energization of the solenoid S18L to move the carriage, through the cylinder 142 to the position illustrated in Figure 11.

It will be appreciated that during the curing and stripping cycle for the left-hand carriage 23L, the right-hand carriage 23R can be blown at the central blow station 30, then moved laterally by its associated cylinder 142 for subjection to the curing and stripping cycle. The operation of the right-hand carriage is the same as that heretofore described for the left-hand unit. In Figures 11 and 12, the electrical and pneumatic apparatus pertinent to the operation of the right-hand unit are identified by the suffix "R," and the lines connecting the valves to the operating stations are identically numbered.

From the operation heretofore described, it will be appreciated that the present invention provides a process which generally includes the steps of positioning a pattern box in registry with a blowhead, introducing into the box a fluid stream having a heat-curable sand composition suspended therein, transferring the pattern box to a curing station, curing the mold or cores in position, separating the cope and drag sections of the pattern box and laterally removing the completed cured mold or cores from between the separated sections. The provision of a single central blowing station and a pair of flanking curing and stripping stations makes possible the simultaneous treatment of two pattern boxes, while occupying the minimum floor space and with a maximum economy of apparatus.

Thus, it will be appreciated by those skilled in the art that the present invention provides a new, inexpensive, compact, and highly efficient method for forming resin bonded shell molds and cores.

While a preferred embodiment of my invention has been described above in detail, it will be understood that numerous modifications may be resorted to without departing from the scope of the following claims.

I claim:

1. In a method of making heat-cured sand cores or molds in two pattern boxes each having separable cope and drag sections, the steps of positioning one of said pattern boxes at a first station, introducing at said first station a heat-curable sand composition into an interior pattern cavity cooperably defined by the cope and drag sections of said one pattern box, shifting the one pattern box to a second station, subsequently positioning a second pattern box at the first station for the introduction of the sand composition thereinto, heat curing the sand composition in the one box while at said second station, separating the cope and drag sections of the one box, stripping and removing cured sand cores or molds from the one box at said second station, shifting said second box to a third station for curing and stripping of the molds or cores therein, and returning said first box to said first station only after said second box has been shifted therefrom.

2. In a process for making heat-cured sand cores or molds in a pattern box having separable cope and drag sections, the steps of advancing a box in a planar path to a blowing station, shifting the box from said path, blowing into the box a fluid stream having a heat-curable sand composition suspended therein, returning the box to said path, transferring the pattern box to a curing station, shifting the box from said path to interpose the box between a pair of spaced heating elements at said curing station, curing the sand cores or molds, elevating the cope from the drag to expose the sand cores or molds while forcibly retaining the molds or cores on the drag, elevating the separate sand cores or molds from the drag, sequentially lifting and laterally removing the cured sand cores or molds from their positions intermediate the cope and the drag, and returning said box to said path for subsequent return to said blowing station.

3. In an apparatus for forming sand cores or molds, a blowing station, a stripping station, means for transferring a pattern box from the blowing station to the stripping station, means at said stripping station for elevating a sand core or mold from the pattern box, supporting means insertable beneath the sand cores or molds, means for elevating said supporting means with the core or mold thereon, and means for moving said supporting means laterally to convey the core or mold therewith.

References Cited in the file of this patent

UNITED STATES PATENTS

| | | |
|---|---|---|
| 1,492,353 | Campbell | Apr. 29, 1924 |
| 2,259,768 | Naylor et al. | Oct. 21, 1941 |
| 2,636,231 | Dougherty | Apr. 28, 1953 |
| 2,721,363 | Taylor | Oct. 25, 1955 |
| 2,724,158 | Davis et al. | Nov. 22, 1955 |

FOREIGN PATENTS

| | | |
|---|---|---|
| 200,254 | Australia | Dec. 3, 1954 |